(12) United States Patent
Liu et al.

(10) Patent No.: US 12,073,235 B2
(45) Date of Patent: Aug. 27, 2024

(54) SYSTEM CALL METHOD AND APPARATUS, AND ELECTRONIC DEVICE

(71) Applicant: NETEASE (HANGZHOU) NETWORK CO., LTD., Zhejiang (CN)

(72) Inventors: Jingyang Liu, Zhejiang (CN); Yongbin Zou, Zhejiang (CN); Yitao Yao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/975,405

(22) PCT Filed: Dec. 5, 2019

(86) PCT No.: PCT/CN2019/123327
§ 371 (c)(1),
(2) Date: Aug. 25, 2020

(87) PCT Pub. No.: WO2021/056823
PCT Pub. Date: Apr. 1, 2021

(65) Prior Publication Data
US 2023/0103210 A1   Mar. 30, 2023

(30) Foreign Application Priority Data

Sep. 24, 2019   (CN) .......................... 201910908623.1

(51) Int. Cl.
*G06F 9/445*     (2018.01)
*G06F 9/455*     (2018.01)

(52) U.S. Cl.
CPC ...... *G06F 9/44521* (2013.01); *G06F 9/45558* (2013.01)

(58) Field of Classification Search
None
See application file for complete search history.

(56) References Cited

U.S. PATENT DOCUMENTS

| 2003/0177476 | A1 | 9/2003 | Sarma et al. | |
|---|---|---|---|---|
| 2010/0100707 | A1* | 4/2010 | Mejdrich | H04L 45/58 712/205 |
| 2013/0276056 | A1* | 10/2013 | Epstein | G06F 21/604 726/1 |
| 2015/0205845 | A1* | 7/2015 | Ocher | G06F 16/254 707/602 |

(Continued)

FOREIGN PATENT DOCUMENTS

| CN | 101866408 A | 10/2010 |
|---|---|---|
| CN | 102591696 A | 7/2012 |

(Continued)

OTHER PUBLICATIONS

Linux Knowledge Accumulation <Linux kernel—hook system call> «https://blog.csdn.net/T146ILa128XX0x/article/details/79102775»; Jan. 19, 2018.

(Continued)

*Primary Examiner* — Wynuel S Aquino
(74) *Attorney, Agent, or Firm* — Qinghong Xu

(57) ABSTRACT

A system call method and apparatus, and an electronic device are provided. The method includes that: when a simulator runs on an operating system, a library file of the simulator and a pre-scanned system call table of the simulator are loaded, the system call table including a system file called by a simulation system in the simulator, and position information of the system file; a target system file associated with the library file is searched in the system call table; and the position information of the target system file is modified to a execution function corresponding to the simulator in the system call table, so as to call the target system file through the execution function.

20 Claims, 4 Drawing Sheets

(56) References Cited

U.S. PATENT DOCUMENTS

| | | | |
|---|---|---|---|
| 2015/0363294 A1* | 12/2015 | Carback, III | G06F 8/70 |
| | | | 717/132 |
| 2016/0314060 A1 | 10/2016 | Poulin | |
| 2018/0217851 A1* | 8/2018 | Sirajuddin | G06F 9/44521 |
| 2019/0087212 A1* | 3/2019 | Yan | G06F 9/455 |
| 2019/0102537 A1* | 4/2019 | Zhang | G06F 21/53 |
| 2019/0146777 A1* | 5/2019 | Liu | G06F 40/157 |
| | | | 717/168 |
| 2019/0220260 A1* | 7/2019 | Gutman | G06F 11/1433 |

FOREIGN PATENT DOCUMENTS

| | | |
|---|---|---|
| CN | 102902928 A | 1/2013 |
| CN | 103793651 A | 5/2014 |
| CN | 104216726 A | 12/2014 |
| CN | 106445630 A | 2/2017 |
| CN | 106959859 A | 7/2017 |
| CN | 108170503 A | 6/2018 |
| IN | 201847007466 A | 4/2018 |

OTHER PUBLICATIONS

Andrew Hann <Linux System Calls Hooking Method Summary>; «https://www.cnblogs.com/LittleHann/p/3854977.html?utm_source=tuicool&utm_medium=referral#_lab2_3_2»; Jul. 21, 2014.

1st Office Action dated Aug. 10, 2020 of Chinese Application No. 201910908623.1.

2nd Office Action dated Nov. 4, 2020 of Chinese Application No. 201910908623.1.

* cited by examiner

SYSTEM CALL METHOD AND APPARATUS, AND ELECTRONIC DEVICE

CROSS-REFERENCE TO RELATED APPLICATIONS

The disclosure claims priority to Chinese Patent Application No. 201910908623.1, filed to the National Intellectual Property Administration, PRC on Sep. 24, 2019, and entitled "SYSTEM CALL METHOD AND APPARATUS, AND ELECTRONIC DEVICE", the entire contents of which are incorporated herein by reference.

TECHNICAL FIELD

The disclosure relates to the technical field of computers, and in particular to a system call method and apparatus, and an electronic device.

BACKGROUND

An Android X86 system is an Android system running on a Windows x86 system. That is, based on the Android X86 system, an Android simulator runs on a Windows operating system. When the Android simulator runs on the Windows operating system, a system call is implemented by related instructions.

SUMMARY

At least some embodiments of the disclosure provide a system call method and apparatus, and an electronic device, so as to improve a system call performance of a simulator and to improve user experience.

An embodiment of the disclosure provides a system call method. The method is applied to a device configured with a simulator, the simulator is configured to call an operating system of the device, and the method includes that: when the simulator runs on the operating system, a library file of the simulator and a pre-scanned system call table of the simulator are loaded, the system call table including a file name of a system file called by a simulation system in the simulator, and position information of the system file; a target system file associated with the library file is searched in the system call table; and position information of the target system file in the system call table is modified to a execution function corresponding to the simulator, so as to call the target system file through the execution function.

Another embodiment of the disclosure provides a system call apparatus. The apparatus is applied to a device configured with a simulator, the simulator is configured to call an operating system of the device, and the apparatus includes: a library file and system call table loading component, configured to load, when the simulator runs on the operating system, a library file of the simulator and a pre-scanned system call table of the simulator, the system call table including: a file name of a system file called by a simulation system in the simulator, and position information of the system file; a target system file search component, configured to search a target system file associated with the library file in the system call table; and a position information modification component, configured to modify the position information of the target system file in the system call table to a execution function corresponding to the simulator, so as to call the target system file through the execution function.

Another embodiment of the disclosure further provides an electronic device, which includes a processor and a memory; and the memory stores a computer executable instruction capable of being executed by the processor, and the processor executes the computer executable instruction to implement the above system call method.

Another embodiment of the disclosure further provides a computer-readable storage medium; the computer-readable storage medium stores a computer executable instruction; and when the computer executable instruction is called and executed by a processor, the computer executable instruction causes the processor to implement the above system call method.

BRIEF DESCRIPTION OF THE DRAWINGS

In order to describe the specific implementation manners of the disclosure or the technical solutions in the conventional art more clearly, a simple introduction on the accompanying drawings which are needed in the specific implementation manners of the disclosure or the technical solutions in the conventional art is given below. Apparently, the accompanying drawings in the description below are some of the embodiments of the disclosure, based on which other drawings may be obtained by those of ordinary skill in the art without any creative effort.

In the figures: 41—library file and system call table loading component; 42—target system file search component; 43—position information modification component; 50—memory; 51—processor; 52—bus; and 53—communication interface.

DETAILED DESCRIPTION

To make the objectives, technical solutions and advantages of the embodiments of the disclosure more clear, a clear and complete description of the technical solutions in the disclosure will be given below. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

In the related art, the system call between the Android X86 system and the Windows x86 system is implemented by int80 instructions. And in a process of implementing the system call through the int80 instructions, a Windows kernel is used. A mode of using the Windows kernel may be prone to poor exception handling performance when the system call is implemented by the int80 instructions, and thus a performance for implementing the system call by the int80 instructions may be poor.

In view of a problem of poor system call performance due to a poor exception handling performance of the existing simulator, at least some embodiments of the disclosure provide a system call method and apparatus, and an electronic device. The technical solution is applied to a device configured with a simulator, such as a computer, a mobile phone, a tablet computer and a gaming device.

For the ease of understanding on the embodiments, a system call method disclosed by the embodiments of the disclosure is first described in detail.

Figure 1:
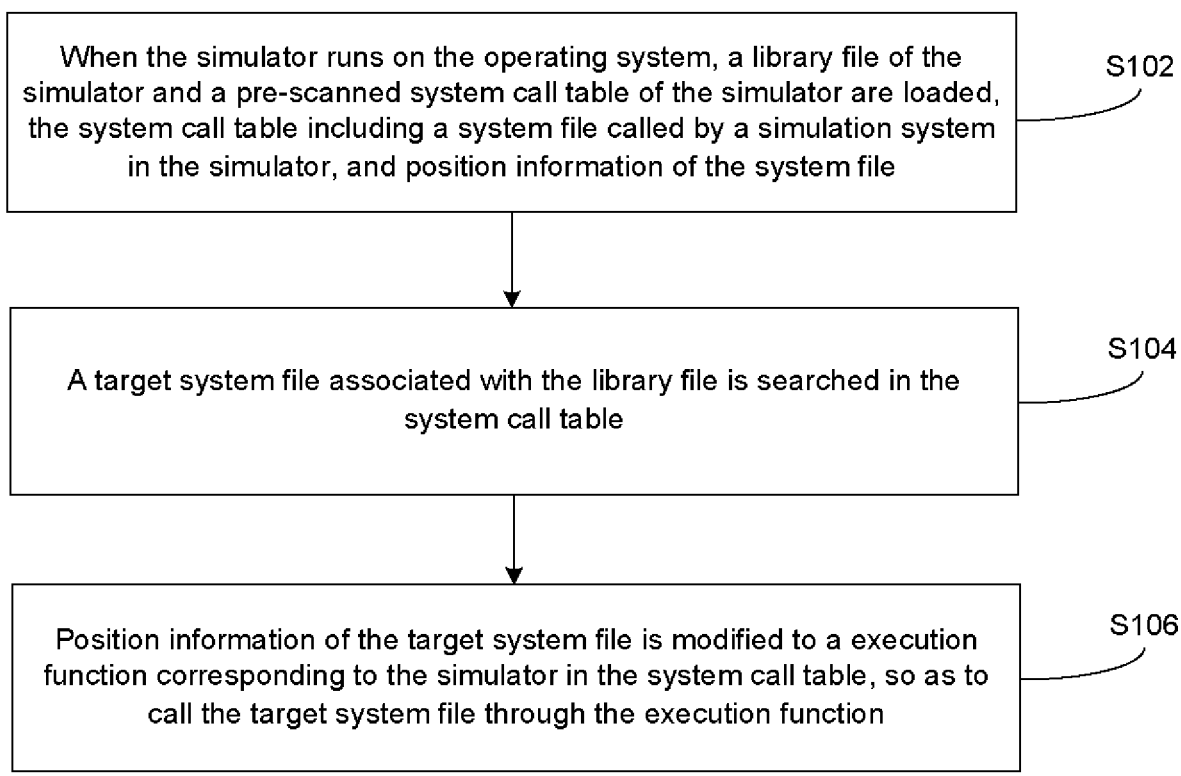
FIG. 1 is a flowchart schematic diagram of a system call method according to an embodiment of the disclosure.

FIG. 1 is a flowchart schematic diagram of a system call method according to an embodiment of the disclosure. The method is applied to a device configured with a simulator, and the simulator is configured to call an operating system of the device. As shown in FIG. 1, the method includes the following steps.

At step S102: when the simulator runs on the operating system, a library file of the simulator and a pre-scanned system call table of the simulator are loaded, the system call table including a file name of a system file called by a simulation system in the simulator, and position information of the system file.

Herein, the simulator refers to a software program compiled based on a computer on a computer platform, and the simulator is capable of simulating to execute a special hardware platform and a program of this special hardware platform. For example, when a certain PS3 simulator runs, the PS3 simulator simulates an environment of PS3 on the computer, such that the formerly exclusive software of the PS3 can run on the computer.

The simulator is configured with a corresponding simulation system. For example, when the simulator is an Android simulator, an Android simulation system corresponding to the Android simulator is configured in the Android simulator. Therefore, the simulator runs on the computer and simulates an Android mobile phone system, and software of an Android application is installed, used and downloaded on the simulator, thereby making the user experience Android games and applications on the computer. Herein, the device configured with the simulator is the computer, the mobile phone, the tablet computer, the gaming device, etc.

In actual operations, when the user needs to use application software corresponding to the simulator on the device configured with the simulator, the simulator calls an operating system of the device to run the application software. Herein, the operating system is a computer program managing computer hardware and software resources, and is further a kernel and a footstone of the computer system. The operating system handles basic affairs, for example, managing and configuring a memory, determining a priority for demands and supplies of system resources, controlling an input device and an output device, operating a network, managing a file system, etc.

When the simulator runs on the operating system, both the library file of the simulator and the pre-scanned system call table of the simulator are loaded. The library file is a Dynamic Linkable Library (DLL) file. When a certain program is executed, the DLL file corresponding to this program is called. Moreover, the system call table includes the file name of the system file called by the simulation system in the simulator, and the position information of the system file. Herein, the system call table is an array pointer table, and an index of an array is an address for implementing system call.

The system file is a file folder for storing main files of the operating system. Generally, the system file is automatically created when the operating system is installed, and relevant files are placed into the corresponding file folder. The file in the file folder has a direct impact on normal operation of the operating system, and cannot be changed freely in most cases. The system file corresponding to the file name in the system call table is a system file called by the simulator when the simulator runs. Usually, the system call is implemented by a dedicated instruction such as an int 80 instruction, a syscall instruction or a sysenter instruction. Additionally, the position information refers to a specific position where the system call happens. In this way, when the simulator runs, the operating system searches the system file to be called according to the system call table, thereby implementing the system call.

At step S104: a target system file associated with the library file is searched in the system call table.

Herein, after the library file and the system call table of the simulator are loaded on the operating system of the device, the system file associated with the library file is searched in the system call table, and determined as the target system file. In the system call table, each system file corresponds to different position information. Hence, after the target system file is searched, the position information corresponding to the target system file can be obtained.

At step S106: position information of the target system file is modified to a execution function corresponding to the simulator in the system call table, so as to call the target system file through the execution function.

After the target system file is searched, the position information corresponding to the target system file is obtained according to the system call table. In this embodiment, the position information corresponding to the target system file is modified to the execution function corresponding to the simulator, such that when the simulation system runs, the target system file is called through the execution function in case of the system call.

Compared with existing system call technologies, since the system call is performed through the dedicated instruction such as the int 80 instruction, the syscall instruction or the sysenter instruction, the cost of the dedicated instruction is higher than the cost of the function call. However, by means of the technical solutions of the disclosure, the system file is called by replacing the int 80 instruction and other software interrupt instructions with the execution function, thereby greatly improving the execution speed of the system call.

According to the system call method provided by the embodiment of the disclosure, when the simulator runs on the operating system, the library file of the simulator and the pre-scanned system call table of the simulator are loaded, the system call table including the file name of the system file called by the simulation system in the simulator, and the position information of the system file; the target system file associated with the library file is searched in the system call table; and the position information of the target system file is modified to the execution function corresponding to the simulator in the system call table, so as to call the target system file through the execution function. Through modifying the system call table of the simulator, when the simulation system calls the system file, the execution function is performed to jump to the system file, thereby intercepting the int 80 instruction and other software interrupt instructions, greatly improving the execution speed of system call, and effectively improving the system call performance of the simulator.

Figure 2:
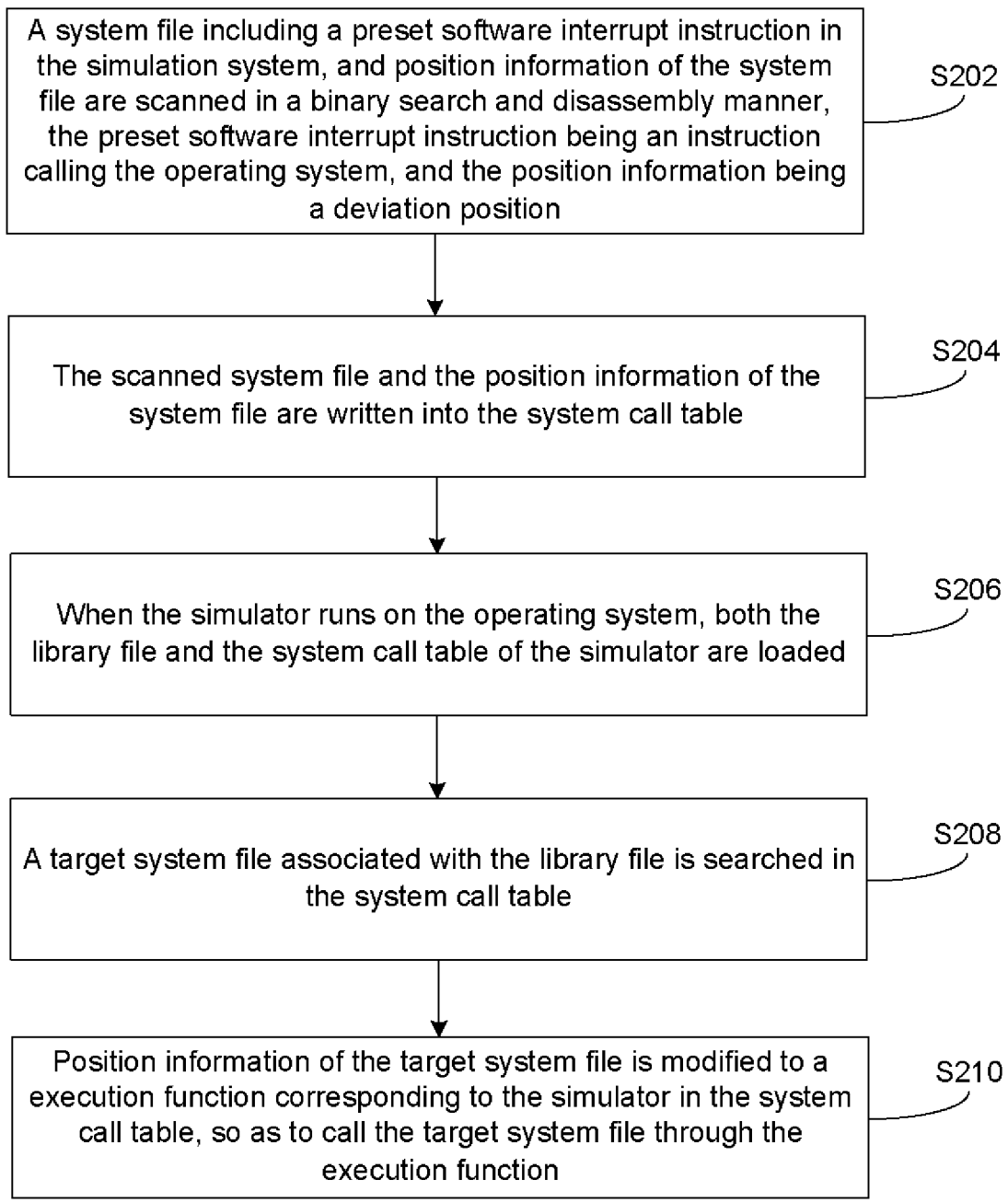
FIG. 2 is a flowchart schematic diagram of another system call method according to an embodiment of the disclosure.

On the basis of the system call method shown in FIG. 1, in some embodiments, another system call method is provided. The method is applied to a device configured with a simulator, and the simulator is configured to call an operating system of the device. The method focuses on describing the specific implementation process for obtaining the above system call table. FIG. 2 is a flowchart schematic diagram of another system call method according to an embodiment of the disclosure. The method includes the following steps.

At step S202: a system file including a preset software interrupt instruction in the simulation system, and position information of the system file are scanned in a binary search and disassembly manner, the preset software interrupt instruction being an instruction calling the operating system, and the position information being a deviation position.

A binary search manner is to perform content matching without a format. For example, by searching a binary number of "010111110010101" in a segment of data, a matching search may be directly performed on a binary level. In addition, the disassembly is a process of converting a target code into an assembly code. The disassembly may be implemented by disassembly software, such as OD, IDA Pro, radare2, DEBUG and C32. The software interrupt instruction refers to a relevant operation in which after an interrupt identifier is set by the program, the hardware continues to execute the interruption. In this embodiment, the software interrupt instruction is an instruction calling the operating system, for example, the software interrupt instruction may be at least one of the int80 instruction, the syscall instruction and the sysenter instruction, etc.

Besides, for different simulation systems, different software interrupt instructions are used generally. Taking the simulation system of the Android simulator as an example, the Android x86 system uses the int 80 instruction to implement the system call. The int 80 instruction is an implementation manner which has long been eliminated by new sysenter series instructions for the early system call. The Android x64 system uses the relatively advanced syscall system call manner. In this case, when the simulation system is the Android x86 system, the software interrupt instruction may be preset as the int80 instruction; and when the simulation system is the Android x64 system, the software interrupt instruction may be preset as the syscall instruction.

In an optional implementation manner, a script file including an objdump command is first generated. The objdump command is a tool for checking a composition of a target file or a composition of an executable target file. And then, a binary static search and disassembly processing is performed on the simulation system through the script file to obtain the system file including the preset software interrupt instruction in the simulation system.

In such a manner, in combination with the binary search and the disassembly, through scanning the simulation system, the system file including the preset software interrupt instruction and the position information corresponding to the system file may be obtained. In this embodiment, the position information is the deviation position.

At step S204: the file name of the scanned system file and the position information of the system file are written into the system call table.

Through taking the Android simulation system as an example, when the simulation system is an Android x86 system, the system file corresponding to the file name written into the system call table is a system file including an int 80 instruction. And when the simulation system is an Android x64 system, the system file corresponding to the file name written into the system call table is a system file including a syscall instruction. Furthermore, while the file name of the system file is written into the system call table, the position information corresponding to the system file, i.e., the deviation position corresponding to the system file, is further written into the system call table.

At step S206: when the simulator runs on the operating system, both the library file and the system call table of the simulator are loaded.

The operating system may be a Windows 32 or Windows 64 system. When the simulator runs on the operating system, both the library file and the system call table of the simulator are loaded.

At step S208: a target system file associated with the library file is searched in the system call table.

At step S210: position information of the target system file is modified to a execution function corresponding to the simulator in the system call table, so as to call the target system file through the execution function.

In an optional implementation manner, the execution function includes a trampline assembly code. Herein, the trampline assembly code is an assembly code added to achieve target logic.

According to the system call method provided by the embodiment, the implementation solution for obtaining the system call table is provided. The system file including the system call instruction in the simulation system and the position information corresponding to the system file are obtained in the binary search and disassembly manner, so as to obtain the system call table of the simulator. When the system call method calls the system file, the int 80 instruction and other software interrupt instructions are intercepted, and the execution function is performed to jump to the system file, thereby improving the execution speed of system call, and improving the system call performance of the simulator.

Figure 3:
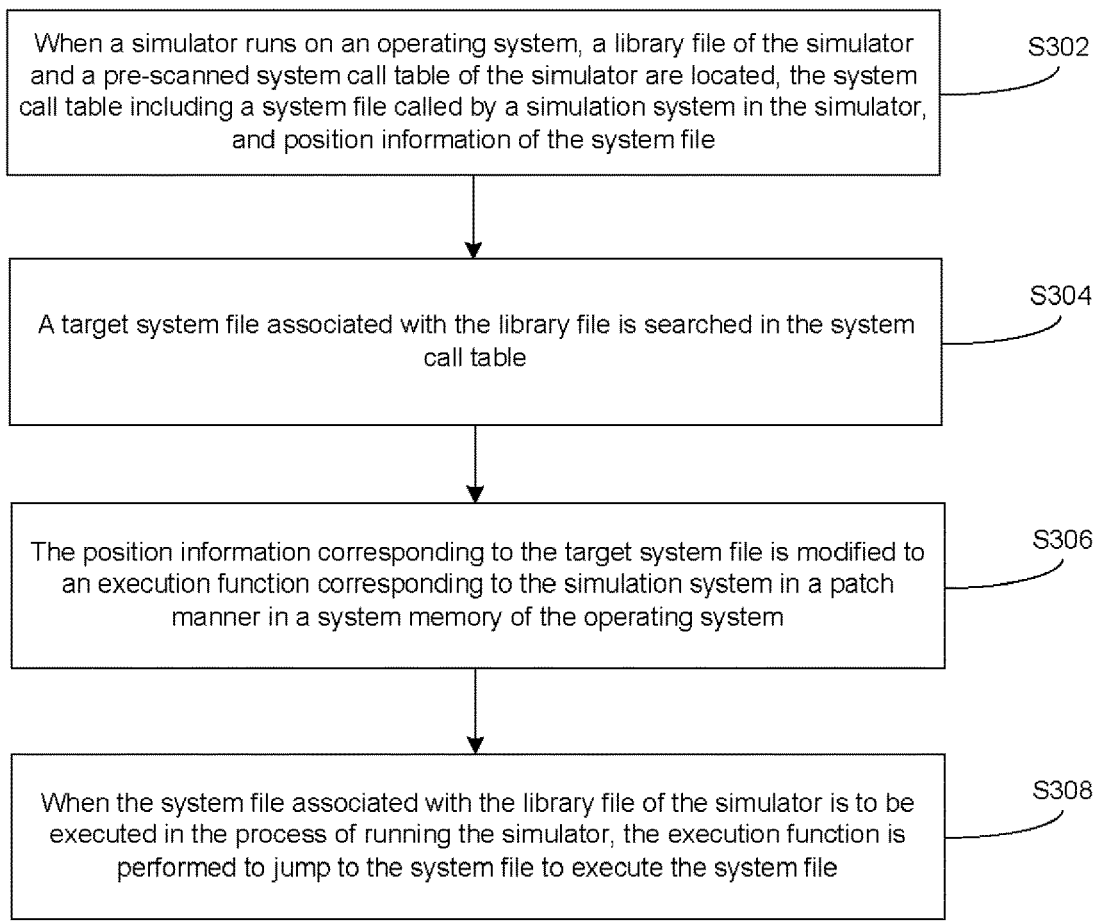
FIG. 3 is a flowchart schematic diagram of another system call method according to an embodiment of the disclosure.

In some embodiments, another system call method is provided. The method is implemented on the basis of the system call method shown in FIG. 1. The method focuses on describing the specific implementation process of modifying the position information of the target system file to the execution function corresponding to the simulator. FIG. 3 is a flowchart schematic diagram of another system call method according to an embodiment of the disclosure. As shown in FIG. 3, the method includes the following steps.

At step S302: when a simulator runs on an operating system, a library file of the simulator and a pre-scanned system call table of the simulator are located, the system call table including a file name of a system file called by a simulation system in the simulator, and position information of the system file.

At step S304: a target system file associated with the library file is searched in the system call table.

In an optional implementation manner, a filename of the library file may be searched in the system call table; and then, a system file in a library corresponding to the filename in the system call table is determined as the target system file associated with the library file.

At step S306: the position information corresponding to the target system file is modified to an execution function corresponding to the simulation system in a patch manner in a system memory of the operating system.

In the system memory of the operating system, the position information corresponding to the target system file is searched, and the position information is patched into the execution function for directly implementing the system call. Herein, the content of the target system file is not changed but positions for all system calls are patched in the memory. Therefore, during running process of the Android APP, in case of the system call, an int 80 interrupt is not generated and the patched code is executed directly.

Furthermore, no matter whether the system call is performed by the int 80 instruction or the syscall instruction, the system call may be modified to the function call in the patch manner.

At step S308: when the system file associated with the library file of the simulator is to be executed in the process of running the simulator, the execution function is performed to jump to the system file to execute the system file.

That is, in the process of running the simulator, when the system file is to be called, the execution function is performed to jump to the system file so that the system file is executed. In another optional implementation manner, after the system file is executed, an execution result of the system file is further received through the execution function. For example, when the system file is executed successfully, an expression of "execution succeed" is returned through the execution function; or otherwise, an expression of "Execution failed" is returned.

Therefore, according to the system call method provided by the embodiment of the disclosure, the int 80 instruction and other software interrupt instructions are intercepted in the patch manner, the technical problem of poor exception handling performance when the system call is implemented through the int 80 instruction is alleviated, and the execution speed of system call and the system call performance are improved.

For the sake of understanding the system call method provided in the above embodiment more clearly, an application example, which is an implementation manner of system call for a Nebula new engine of a Netease MuMu simulator, is described in the embodiment. The specific process of the method is as follows:

(1) Position information where the system call occurs in a whole Android Read-Only Memory (ROM) is searched statically through a script consisting of an objdump command to generate a global system call table.

(2) The system call table is loaded in a main program of the Nebula.

(3) A series of assembly codes called as trampline are established in an execution memory of the Nebula, so as to simulate an entrance and an exit of the system call.

(4) When an Executable and Linkable Format (ELF) binary is loaded, a content of the ELF binary is patched according to the system call table, and thereafter, the whole system call no longer occurs.

Therefore, all system call scenarios of the Android ROM are modified to a logic of directly jumping to a trampline program. Thus, during the running process of the Android APP, in case of the system call, the patched code is read and executed directly, and the int 80 interrupt is not generated. It is showed by the practical test that for the operating system using the system call method, the call speed of the single system may be improved by 3-30 times.

Unlike a Aow engine solution of a Tencent mobile game assistant, a simulated call service of the int 80 is implemented in a kernel component in the Aow engine solution, and the solution still has the following shortages:

(1) The program is hard to be debugged.

(2) The abnormal program results in the system blue screen.

(3) The exception handling performance of the int 80 is poor.

(4) The x64 syscall manner cannot be directly supported.

However, the Nebula new engine is not configured with the kernel component but is a full-user space, so no blue screen problem exits, and the debugging is also simple and easy. When the system file is called, the Nebula new engine intercepts the int 80 instruction and other software interrupt instructions (such as the syscall) in the patch manner, and the execution function is performed to jump to the system file. Such a patch manner may be adapted for the call of x86 and x64 systems, and the problem that the call of the x64 system cannot be directly handled in the industry is alleviated.

By means of the system call method, the expensive exception handling or system call is replaced with a simple jmp command, which not only makes a huge progress in performance and energy conservation, but also greatly improves the execution speed of system call and improves the system call performance of the simulator.

Figure 4:
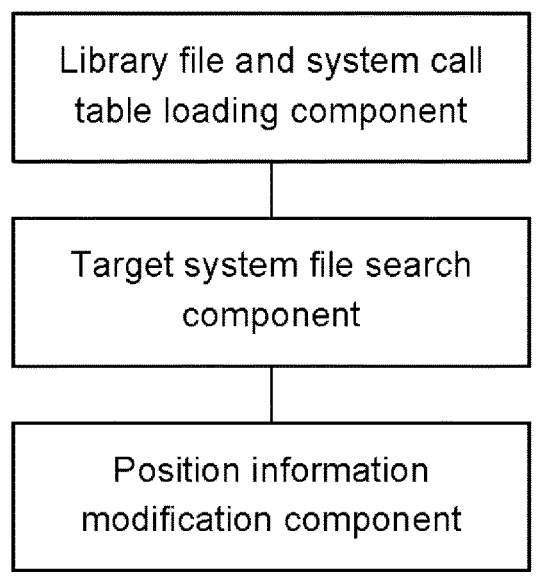
FIG. 4 is a structural schematic diagram of a system call apparatus according to an embodiment of the disclosure.

Corresponding to the system call method in the above embodiment, at least some embodiments of the disclosure further provide a system call apparatus. The apparatus is applied to a device configured with a simulator, and the simulator is configured to call an operating system of the device. FIG. 4 is a structural schematic diagram of the apparatus. As shown in FIG. 4, the apparatus includes a library file and system call table loading component 41, a target system file search component 42 and a position information modification component 43. Each component has the following functions.

The library file and system call table loading component 41 is configured to load, when a simulator runs on an operating system, a library file of the simulator and a pre-scanned system call table of the simulator, the system call table including: a file name of a system file called by a simulation system in the simulator, and position information of the system file.

The target system file search component 42 is configured to search a target system file associated with the library file in the system call table.

The position information modification component 43 is configured to modify the position information of the target system file in the system call table to a execution function corresponding to the simulator, so as to call the target system file through the execution function.

According to the system call apparatus, when the simulator runs on the operating system, the library file of the simulator and the pre-scanned system call table of the simulator are loaded, the system call table including the file name of the system file called by the simulation system in the simulator, and the position information of the system file; the target system file associated with the library file is searched in the system call table; and position information of the target system file in the system call table is modified to a execution function corresponding to the simulator, so as to call the target system file through the execution function. Through modifying the system call table of the simulator, when the simulation system calls the system file, the execution function is performed to jump to the system file, thereby intercepting an int 80 instruction and other software interrupt instructions, greatly improving the execution speed of system call, improving the system call performance of the simulator and improving the user experience.

In an optional implementation manner, the library file and system call table loading component 41 is further configured to: scan, in binary search and disassembly manners, the system file including a preset software interrupt instruction, and the position information of the system file in the simulation system, the preset software interrupt instruction being an instruction calling the operating system, and the position information being a deviation position; and write the file name of the system file and the position information of the system file into the system call table.

In another possible implementation manner, the library file and system call table loading component 41 is further configured to: generate a script file including an objdump command; and perform a binary static search and disassembly processing on the simulation system through the script file to obtain the system file including the preset software interrupt instruction in the simulation system.

In another possible implementation manner, when the simulation system is an Android x86 system, the system file corresponding to the file name in the system call table is a system file including an int80 instruction; and when the simulation system is an Android x64 system, the system file corresponding to the file name in the system call table is a system file including a syscall instruction.

In another possible implementation manner, the target system file search component 42 is further configured to: search a filename of the library file in the system call table; and determine a system file in a library corresponding to the filename in the system call table as the target system file associated with the library file.

In another possible implementation manner, the position information modification component 43 is further configured to: modify the position information corresponding to the target system file to the execution function corresponding to the simulation system in a patch manner in a system memory of the operating system.

In another possible implementation manner, the system call apparatus may further include a jump component, configured to jump, when the system file associated with the library file of the simulator is to be executed in the process of running the simulator, to the system file through the execution function to execute the system file.

In another possible implementation manner, the system call apparatus may further include an execution result receiving component, configured to receive an execution result of the system file through the execution function.

In another possible implementation manner, the execution function includes a trampline assembly code.

In another possible implementation manner, the operating system includes a Windows 32 or Windows 64 system.

The system call apparatus according to the embodiment of the disclosure has the same implementing principles and technical effects with the system call method in the above embodiment. For the briefness of the description, the part not mentioned in the embodiment of the system call apparatus may refer to the corresponding content of the system call method in the above embodiment.

Figure 5:
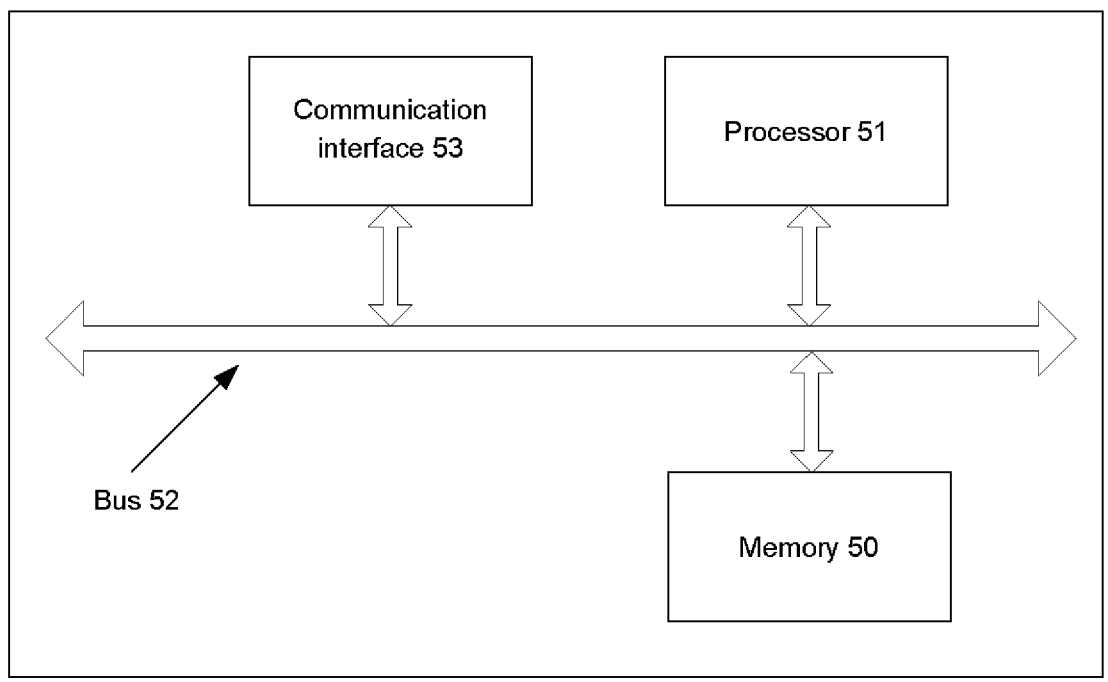
FIG. 5 is a structural schematic diagram of an electronic device according to an embodiment of the disclosure.

The embodiments of the disclosure further provide an electronic device. FIG. 5 is a structural schematic diagram of the electronic device according to an embodiment of the disclosure. The electronic device includes a processor 51 and a memory 50. The memory 50 stores a computer executable instruction capable of being executed by the processor 51, and the processor 51 executes the computer executable instruction to implement the above system call method.

In the implementation manner shown in FIG. 5, the electronic device may further include a bus 52 and a communication interface 53. The processor 51, the communication interface 53 and the memory 50 are connected through the bus 52.

The memory 50 includes a high-speed Random Access Memory (RAM), and may also include a non-volatile memory, such as at least one magnetic disk memory. The communicative connection between a system network element and at least one of other network elements is implemented by at least one communication interface 53 (which may be a wired or wireless communication interface). An Internet, a wide area network, a local network, a metropolitan area network and the like may be used. The bus 52 may be an Instruction Set Architecture (ISA) bus, a Programmable Communications Interface (PCI) bus or an Extended Industry Standard Architecture (EISA) bus or the like. The bus 52 may be divided into an address bus, a data bus, a control bus, etc. For the convenience of description, one double sided arrow is used for indicating the bus in FIG. 5. However, it does not mean that only one bus or one type of bus is provided.

The processor 51 may be an integrated circuit chip, and has a signal processing capability. During implementation, each step of the method may completed by means of an instruction in a form of an integrated logic circuit of hardware in the processor 51 or software. The processor 51 may be a universal processor, including a Central Processing Unit (CPU), a Network Processor (NP), etc., and may also be a Digital Signal Processor (DSP), an Application Specific Integrated Circuit (ASIC), a Field-Programmable Gate Array (FPGA) or other programmable logic devices, discrete gates or transistor logic devices, and discrete hardware components. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software components in the decoding processor. The software component may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in the memory, and the processor 51 reads information in the memory, and completes the steps of the system call method in combination with hardware.

Figure 6:
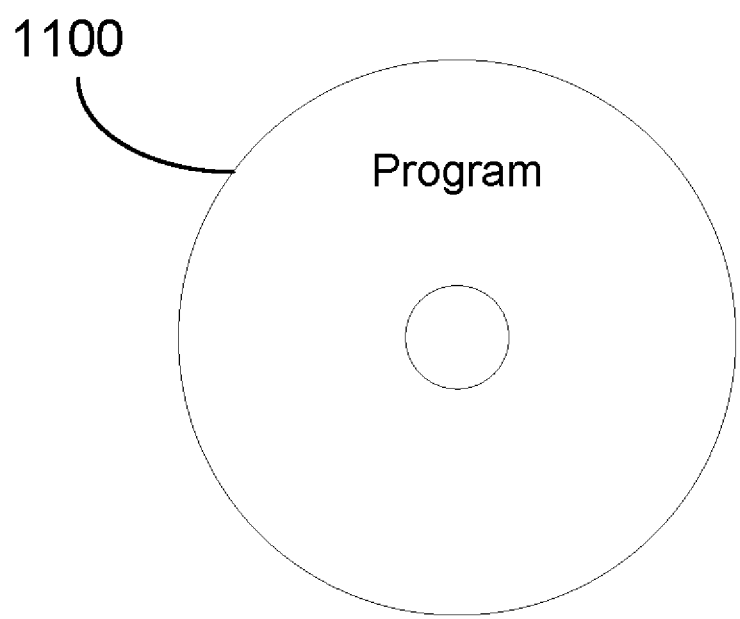
FIG. 6 is a structural schematic diagram of a computer-readable storage medium according to an embodiment of the disclosure.

FIG. 6 is a structural schematic diagram of a computer-readable storage medium according to an embodiment of the disclosure. As shown in FIG. 6, a program product 1100 according to an implementation manner of the application is described, which stores a computer program thereon. The computer program includes a computer executable instruction; and when the computer executable instruction is called and executed by a processor, the computer executable instruction causes the processor to implement the above system call method. The specific implementation may refer to the above method embodiment and will no longer elaborated.

The system call method, the system call apparatus and the computer program product of the electronic device according to the embodiments of the disclosure include a computer-readable storage medium storing a program code; and an instruction included in the program code may be configured to execute the system call method in the above method embodiment. The specific implementation may refer to the method embodiment and will no longer be elaborated.

Unless otherwise specified, relative arrangements of components and steps elaborated in these embodiments, numeric expressions and numeric values do not limit the scope of the disclosure.

When being realized in form of software functional element and sold or used as an independent product, the function may also be stored in a non-volatile computer-readable storage medium executable for a processor. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as a U disk, a mobile hard disk, an ROM, an RAM, a magnetic disk or an optical disk.

At last, it is to be noted that the above embodiments are merely the specific implementation manners of the disclosure for describing the technical solutions of the disclosure, rather than to limit the disclosure. Although the disclosure is described in detail with reference to the foregoing embodiments, those of ordinary skill in the art should understand that: any person skilled in the art may still make modifications or conceivable changes on the technical solutions in the foregoing embodiments, or make equivalent replacements for a part of technical features therein. Those modifications, changes or replacements do not make the essence of the corresponding technical solutions depart from the spirit and scope of the technical solutions of the embodiments of the disclosure, and should be included in the scope of protection of the disclosure. Therefore, the scope of protection of the disclosure should be subjected to the scope of protection of the claims.

INDUSTRIAL APPLICABILITY

When the simulator runs on the operating system, the library file of the simulator and the pre-scanned system call table of the simulator are loaded, the system call table including the file name of the system file called by the simulation system in the simulator, and the position information of the system file; the target system file associated with the library file is searched in the system call table; and position information of the target system file in the system call table is modified to a execution function corresponding to the simulator, so as to call the target system file through the execution function. Therefore, the disclosure achieves the technical effects that the int 80 instruction and other software interrupt instructions are intercepted, the execution speed of system call is improved, and the system call performance of the simulator is improved.

What is claimed is:

1. A system call method, applied to a device configured with a simulator having a simulation system, the simulator being configured to call an operating system of the device, and the method comprising:
scanning, in a binary search and disasembly manner, the simulation system to obtain a system call table of the simulator, wherein the system call table comprises a file name of a system file to be called by the simulation system when the simulator is running, and position information of the system file, the system file corresponding to the operating system; wherein the system file comprises a preset software interrupt instruction that calls the operating system;
writing the file name of the system file and the position information of the system file into the system call table;
loading, in response to determining that the simulator runs on the operating system, a library file of the simulator and the system call table;
searching, in the obtained system call table, a target system file associated with the library file;
subsequent to the searching, modifying position information of the target system file in the system call table to an execution function corresponding to the simulator; wherein the execution function performs a jump instruction to the target system file;
calling, in response to determining that the simulator calls the operating system, the target system file through the execution function, wherein the calling of the target system file comprises intercepting the preset software interrupt instruction in the system file; and
running an application software corresponding to the simulator in response to the called execution function.

2. The method as claimed in claim 1, wherein
the position information being a deviation position.

3. The method as claimed in claim 2, wherein scanning, in the binary search and disassembly manner, the system file comprising the preset software interrupt instruction in the simulation system comprises:
generating a script file comprising an objdump command; and
performing a binary static search and disassembly processing on the simulation system through the script file to obtain the system file comprising the preset software interrupt instruction in the simulation system.

4. The method as claimed in claim 3, wherein the objdump command is a tool for checking a composition of a target file or a composition of an executable target file.

5. The method as claimed in claim 2, wherein the software interrupt instruction comprises: an int80 instruction, a syscall instruction or a sysenter instruction.

6. The method as claimed in claim 2, wherein when the simulation system is the Android x86 system, the preset software interrupt instruction is an int 80 instruction; and when the simulation system is the Android x64 system, the preset software interrupt instruction is a syscall instruction.

7. The method as claimed in claim 1, wherein
if the simulation system is an Android x86 system, the system file in the system call table is a system file comprising an int80 instruction; and
if the simulation system is an Android x64 system, the system file in the system call table is a system file comprising a syscall instruction.

8. The method as claimed in claim 1, wherein searching the target system file associated with the library file in the system call table comprises:
searching a filename of the library file in the system call table; and
determining a system file in a library corresponding to the filename in the system call table as the target system file associated with the library file.

9. The method as claimed in claim 1, wherein modifying the position information of the target system file to the execution function corresponding to the simulator comprises:
directly modifying the position information corresponding to the target system file to the execution function corresponding to the simulation system in a patch manner in a system memory of the operating system.

10. The method as claimed in claim 9, wherein the patch manner is adapted for the call of x86 and x64 systems.

11. The method as claimed in claim 1, after modifying the position information of the target system file to the execution function corresponding to the simulator, further comprising:
when the system file associated with the library file of the simulator is to be executed in a process of running the simulator, jumping to the system file through the execution function to execute the system file.

12. The method as claimed in claim 11, wherein after jumping to the system file through the execution function to execute the system file, further comprising:
receiving an execution result of the system file through the execution function.

13. The method as claimed in claim 1, wherein the library file is a Dynamic Linkable Library (DLL) file.

14. The method as claimed in claim 1, wherein the system call table is an array pointer table, and an index of an array is an address for implementing system call.

15. The method as claimed in claim 1, wherein the execution function comprises a trampline assembly code, the trampline assembly code referring to an assembly code added to achieve target logic.

16. The method as claimed in claim 15, wherein the trampline assembly code is used for simulating an entrance and an exit of the system call.

17. The method as claimed in claim 1, wherein the position information refers to a specific position where the system call happens.

18. The method as claimed in claim 1, wherein when the simulator runs, the operating system searches the system file to be called according to the system call table.

19. An electronic device, comprising a processor and a memory, wherein the memory stores a computer executable instruction capable of being executed by the processor, the device configured with a simulator having a simulation system, the simulator being configured to call an operating system of the device, the processor is configured to perform:
scanning, in a binary search and disasembly manner, the simulation system to obtain a system call table of the simulator, wherein the system call table comprises a file name of a system file to be called by the simulation system when the simulator is running, and position information of the system file, the system file corresponding to the operating system; wherein the system file comprises a preset software interrupt instruction that calls the operating system;
writing the file name of the system file and the position information of the system file into the system call table;
loading, in response to determining that the simulator runs on the operating system, a library file of the simulator and the system call table;
searching, in the obtained system call table, a target system file associated with the library file;
subsequent to the searching, modifying the position information of the target system file in the system call table to an execution function corresponding to the simulator; wherein the execution function performs a jump instruction to the target system file;
calling, in response to determining that the simulator calls the operating system, the target system file through the execution function, wherein the calling of the target system file comprises intercepting the preset software interrupt instruction in the system file; and
running an application software corresponding to the simulator in response to the called execution function.

20. A non-transitory computer-readable storage medium, storing a computer executable instruction, wherein when the computer executable instruction is called and executed by a processor of a device configured with a simulator having a simulation system, the simulator being configured to call an operating system of the device, the processor is configured to perform:
scanning, in a binary search and disasembly manner, the simulation system to obtain a system call table of the simulator, wherein the system call table comprises a file name of a system file to be called by the simulation system when the simulator is running, and position information of the system file, the system file corresponding to the operating system; wherein the system file comprises a preset software interrupt instruction that calls the operating system;
writing the file name of the system file and the position information of the system file into the system call table;
loading, in response to determining that the simulator runs on the operating system, a library file of the simulator and the system call table;
searching, in the obtained system call table, a target system file associated with the library file;
subsequent to the searching, modifying the position information of the target system file in the system call table to an execution function corresponding to the simulator; wherein the execution function performs a jump instruction to the target system file;
calling, in response to determining that the simulator calls the operating system, the target system file through the execution function, wherein the calling of the target system file comprises intercepting the preset software interrupt instruction in the system file; and
running an application software corresponding to the simulator in response to the called execution function.

* * * * *